(12) United States Patent
Sahoo

(10) Patent No.: US 9,152,384 B2
(45) Date of Patent: Oct. 6, 2015

(54) SYSTEM AND METHOD FOR REFERENCING A DYNAMIC MODULE SYSTEM WITHIN A COMPONENT ORIENTED APPLICATION DEVELOPMENT FRAMEWORK

(71) Applicant: Oracle International Corporation, Redwood Shores, CA (US)

(72) Inventor: Sanjeeb Kumar Sahoo, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 54 days.

(21) Appl. No.: 14/137,483

(22) Filed: Dec. 20, 2013

(65) Prior Publication Data

US 2015/0046914 A1 Feb. 12, 2015

Related U.S. Application Data

(60) Provisional application No. 61/865,005, filed on Aug. 12, 2013.

(51) Int. Cl.
*G06F 9/44* (2006.01)
*G06F 9/445* (2006.01)

(52) U.S. Cl.
CPC .............. *G06F 8/00* (2013.01); *G06F 9/44521* (2013.01)

(58) Field of Classification Search
None
See application file for complete search history.

(56) References Cited

U.S. PATENT DOCUMENTS

| | | | |
|---|---|---|---|
| 2004/0194059 A1 | 9/2004 | Akella et al. | |
| 2007/0061798 A1 | 3/2007 | Atsatt | |
| 2007/0198475 A1* | 8/2007 | Meduri et al. | 707/3 |
| 2009/0276755 A1* | 11/2009 | Beltowski et al. | 717/118 |
| 2011/0078659 A1 | 3/2011 | Stark et al. | |
| 2012/0005663 A1 | 1/2012 | Burckart et al. | |
| 2014/0298332 A1* | 10/2014 | Cai et al. | 718/1 |

* cited by examiner

*Primary Examiner* — Philip Wang
(74) *Attorney, Agent, or Firm* — Tucker Ellis LLP

(57) ABSTRACT

A system and method can support a hybrid application development environment. The system allows a client application in the application runtime environment to obtain a reference to a framework instance for a dynamic module system. Furthermore, the system can configure a bundle in the dynamic module system to be a gateway bundle based on the framework instance, and the client application can access the dynamic module system using the gateway bundle.

20 Claims, 8 Drawing Sheets

_US 9,152,384 B2_

SYSTEM AND METHOD FOR REFERENCING A DYNAMIC MODULE SYSTEM WITHIN A COMPONENT ORIENTED APPLICATION DEVELOPMENT FRAMEWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims priority on U.S. Provisional Patent Application No. 61/865,005, entitled "SYSTEM AND METHOD FOR INTEGRATING A DYNAMIC MODULE SYSTEM WITH A COMPONENT ORIENTED APPLICATION DEVELOPMENT FRAMEWORK" filed Aug. 12, 2013, which application is herein incorporated by reference.

CROSS REFERENCE TO RELATED APPLICATIONS

This application is related to the following patent application, which is hereby incorporated by reference in its entirety:

U.S. Patent Application entitled "SYSTEM AND METHOD FOR PROVISIONING A DYNAMIC MODULE SYSTEM WITHIN A COMPONENT ORIENTED APPLICATION DEVELOPMENT FRAMEWORK," application Ser. No. 14/137,455, filed Dec. 20, 2013.

FIELD OF INVENTION

The present invention is generally related to computer systems, and is particularly related to providing an application development framework for software developers.

BACKGROUND

As software systems become more complex, the component orientation and code modularity have become increasingly important design goals. Assembling software from reusable components enables developers to reuse code, to modify software quickly when requirements evolve, to mitigate costs of producing multiple versions, and to reduce development time by integrating pre-written, third-party components.

This is the general area that embodiments of the invention are intended to address

SUMMARY

Described herein is a system and method that can support an application development framework. The system allows a client application in the application development environment to obtain a reference to a framework instance for a dynamic module system. Furthermore, the system can configure a bundle in the dynamic module system to be a gateway to the dynamic module system, and the client application can access the dynamic module system using the gateway bundle.

DETAILED DESCRIPTION

Figure 1:
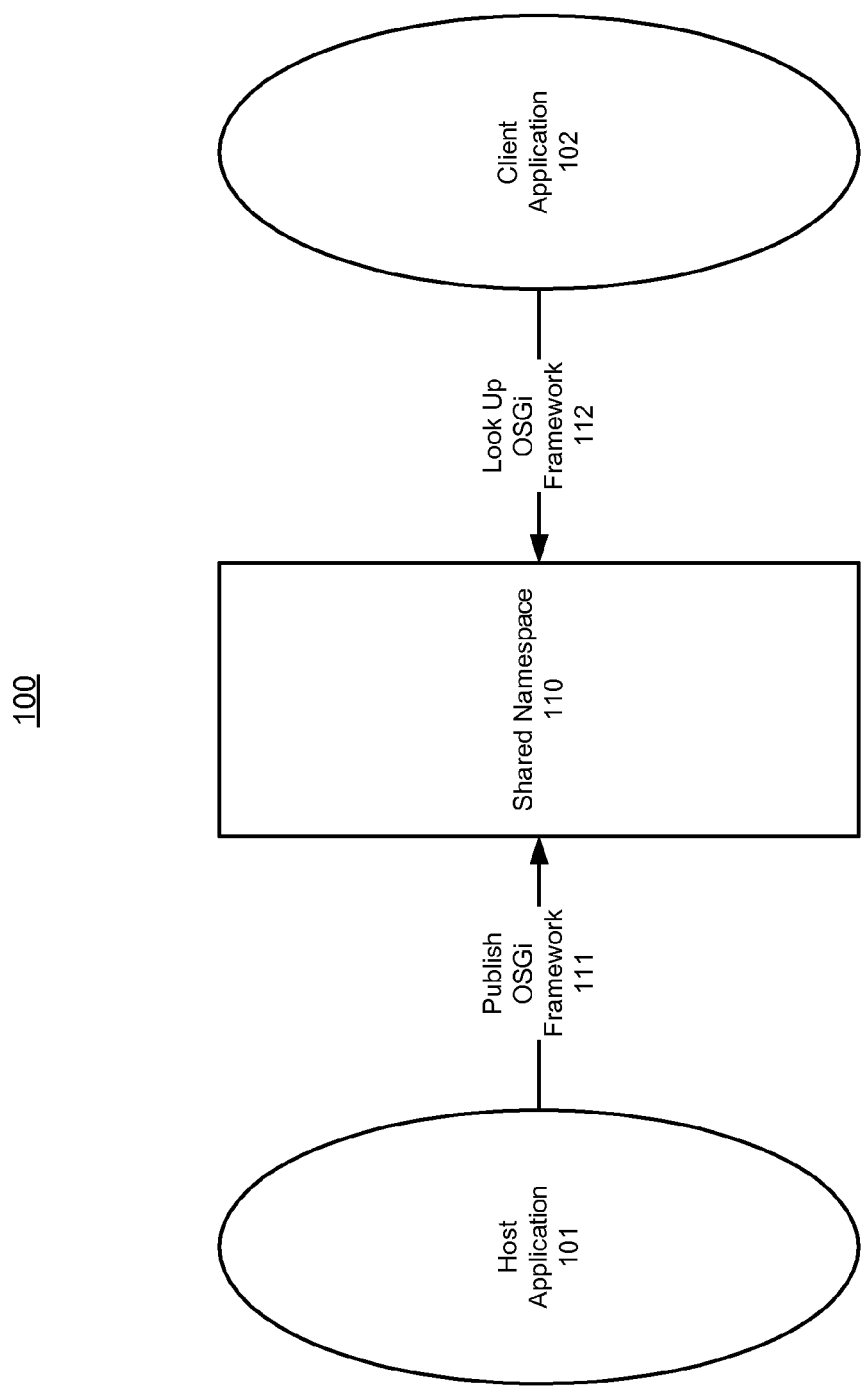
FIG. 1 shows an illustration of supporting platform integration in an application development environment, in accordance with an embodiment of the invention.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the following embodiments of the invention uses the Java Platform, Enterprise Edition (or Java EE) platform as an example for an application development environment. It will be apparent to those skilled in the art that other types of application development environment can be used without limitation. Also, the description of the following embodiments of the invention uses the OSGi (formerly known as the Open Services Gateway initiative, now an obsolete name) platform as an example for a dynamic module system. It will be apparent to those skilled in the art that other types of dynamic module systems can be used without limitation.

Described herein is a system and method that can provide a component oriented modular framework for software developers.

Component Oriented Modular Software Development

Various component oriented modular frameworks can be provided to Java developers. Although these application development frameworks may all have a notion of application container, to which software developers can deploy their applications, there can be significant differences among them.

For example, a component oriented application development framework, e.g. the Java EE platform, can define a set of services, application programming interfaces (APIs), and protocols that can facilitate component oriented application development. However, the Java EE framework, which allows the development of secured, persistence aware, transactional, and scalable Java applications, may provide limited support for modularity.

On the other hand, the OSGi platform provides a framework for building modular, service-oriented applications, and addresses the modularity needs of applications.

For example, the OSGi platform allows an application to be decomposed into smaller units called modules (a.k.a. bundles). A module in the OSGi platform, which is a unit of deployment and management, can include a cohesive set of Java classes and resources that can provide a well defined functionality. Also, each module can contain additional metadata that explicitly states a module's capabilities and requirements (or dependencies).

The OSGi platform can be responsible for matching a module's requirements with capabilities offered by other modules in the runtime. Also, the OSGi platform can define a sophisticated service framework, which allows modules to registers plain old Java objects (POJO) as services in a service registry. Additionally, the OSGi platform can have excellent support for versioning and dynamicity.

For example, each OSGi bundle can have its own class loader, which can be created by the OSGi runtime. Every bundle class loader (with the exception of the system bundle) can have a private classpath, which points to resources packaged inside the bundle jar. Additionally, every bundle class loader can have a list of other bundle class loaders to be used as delegate loaders in order to satisfy the external dependencies of a bundle.

On the other hand, a system bundle, which can be considered as a virtual bundle, can be based on an OSGi framework instance. The OSGi framework instance can be associated with an "org.osgi.framework.launch.Framework" type and can implement an "org.osgi.framework.Bundle" interface. Furthermore, the content for the system bundle may not come from a bundle jar file or other bundles. The OSGi environment can load the system bundle using the class loader that is used to load the OSGi framework class. Thus, the class loading of system bundle can be under the control of an application developer.

Otherwise, the system bundle appears as a regular bundle to the rest of the OSGi environment. The system bundle can publish and consume services. Also, the system bundle can export packages. A user can configure an exported package list for a system bundle using properties such as "org.osgi.framework.system.packages" or "org.osgi.framework.system.packages.extra." Furthermore, the exported packages can have use constraints, which ensure consistent class space in a multi-versioned environment. On the other hand, the system may not import any packages, due to the fact that the class loader for a system bundle is not controlled by the OSGi runtime.

There have been various efforts to integrate the Java EE platform with the OSGi platform. The existing approaches all require a fundamental change to the way that the Java EE application is developed and deployed. For example, since the OSGi runtime becomes the deployment platform, all applications have to be repackaged and deployed as one or more OSGi bundles.

Thus, the existing approaches, which require an application to be developed and deployed as a set of modules, may have various drawbacks.

For example, retrofitting existing monolithic Java EE applications into the OSGi model can be a heavy-duty task for the Java EE application developers. Also, changes to the existing Java EE tools and practices may waste the investment over the years.

Additionally, switching the entire Java EE application to run under the control of the OSGi framework can be inherently risky, because the underlying Java EE technologies may not consistently support the application modularity. For example, a Java EE application may take advantage of the context loader of a thread in order to achieve extensibility with an assumption of the global visibility, which may not be true in the OSGi environment.

Native Java EE Module as an OSGi Bundle

In accordance with an embodiment of the invention, the system can integrate a dynamic module system, e.g. an OSGi platform, with a component oriented application development framework, e.g. a J2EE platform.

The system can provide a migration path to gradually modularize a Java EE application. For example, the system enables the Java EE application developers to leverage OSGi platform, while allowing the Java EE application developers to continually using their existing software development environment, code and processes.

The incremental process can inherently safeguard the modularization of an application and does not affect developer productivity. Since the changes to the Java EE applications are incremental in nature, it is a safer option, or solution, that is suitable for most enterprise Java developers. Also, the incremental process allows the applications to take full advantage of the OSGi platform. Thus, the software developers can be successful in developing modular enterprise Java applications.

In accordance with an embodiment of the invention, the system can provide a hybrid environment that allows the software developers to take advantage of the features provided by both the J2EE platform and the OSGi platform. These features can include modularity/dependency management, and service dynamism, provided by the OSGi platform. Additionally, the system allows the software developers to use different component frameworks, such as EJB, Servlet, JAX-RS, JSF, CDI, etc. Also, the system allows the software developers to use various infrastructure services, such as transaction management, security, and persistence, offered by the Java EE platform.

Furthermore, the system allows a Java EE developer to turn an existing application into an OSGi bundle, while permitting the Java EE application to run inside the existing Java EE runtime. Also, the system allows different Java EE applications to be deployed into a traditional Java EE container, while allowing the Java EE applications to expose their resources (e.g. classes, EJBs, beans) to the OSGi runtime. Thus, the Java EE applications do not have to be restructured as OSGi bundles in order to leverage the OSGi platform, and the OSGi runtime can make these resources available for consumption by other Java EE applications and non-Java EE applications.

In accordance with an embodiment of the invention, the system can leverage the virtual bundle capability, e.g. based on the system bundle feature in the OSGi platform, in order to provide support for integration between the OSGi platform and the Java EE platform. For example, the system enables the following use cases, which may otherwise be difficult to achieve in a pure Java EE environment:

Accessing libraries and application classes from the OSGi platform,
Easier packaging of client applications,
Local EJBs across application boundaries,
EJB as a Service, and
Application Chaining.

Thus, the system, which can be simple to implement, does not require the underlying Java EE server runtime to run on a modular platform, such as the OSGi runtime. Also, the system allows more development time for modularizing the Java EE server runtime.

FIG. 1 shows an illustration of supporting platform integration in an application development environment 100, in accordance with an embodiment of the invention. As shown in FIG. 1, a host application 101 can use a shared namespace 110, such as Java naming and directory interface (JNDI), to provision an OSGi framework 111, while a client application 102 can use a provisioned framework 112.

The host application 101 can chose to keep the OSGi framework private to itself or make the OSGi framework available globally for other applications. On the other hand, an application may need to be a client application 102 in order to export or import resources. Furthermore, a host application 101 can be implicitly a client application 102.

Thus, there can be different aspects for enabling the OSGi/Java EE integration via supporting using OSGi platform from within Java EE applications. These different aspects can include the provisioning of an OSGi Framework by a Java EE application, and the referencing the OSGi runtime from a Java EE application to export/import resources. Here, the resources can include the classes and static resources, such as images, properties file available via application class loader chain, and application objects, such as EJBs, JDBC data sources, CDI beans, etc., which are managed by a Java EE application container.

Host Application

Figure 2:
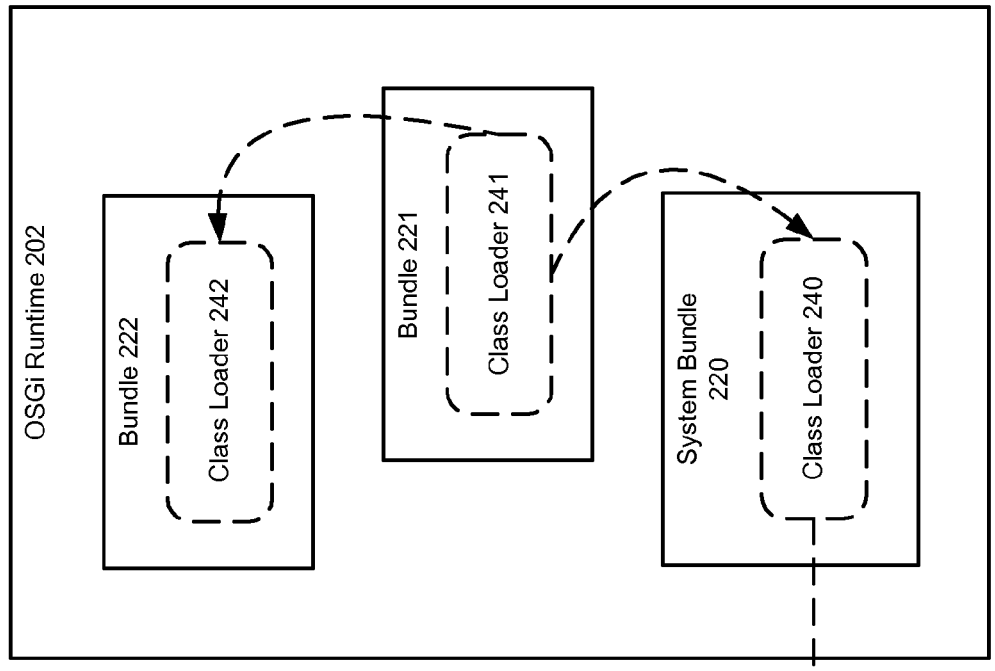
FIG. 2 shows an illustration of supporting a host application in an application development environment, in accordance with an embodiment of the invention.
Figure 2:
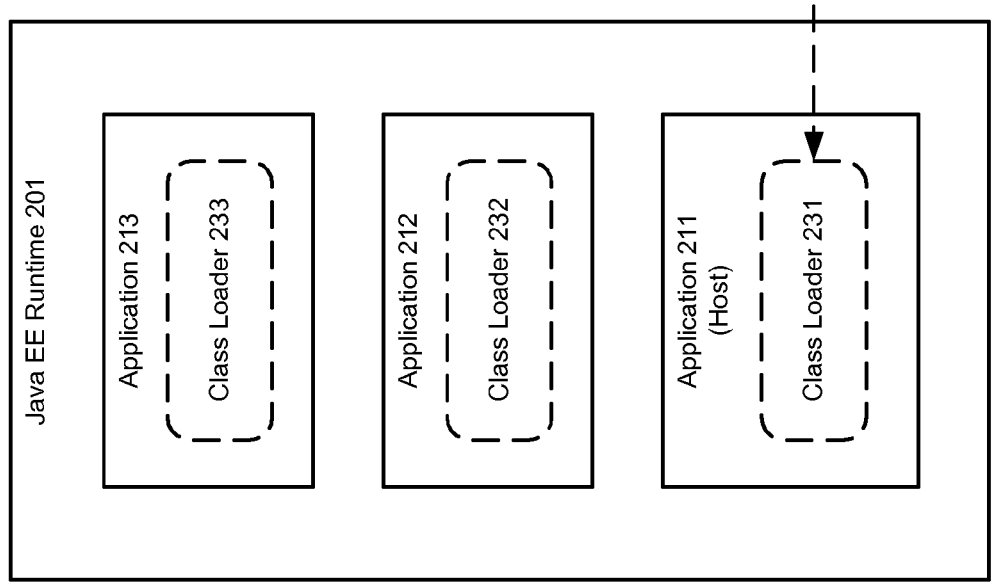

FIG. 2 shows an illustration of supporting a host application in an application development environment, in accordance with an embodiment of the invention. As shown in FIG. 2, an application development environment 200 enables the integration of an application runtime environment, e.g. a Java EE runtime 201, with a dynamic module system, e.g. an OSGi runtime 202. For example, the Java EE runtime 201 can support different applications 211-213 with corresponding class loaders 231-233, and the OSGi Runtime 502 can support different bundles 220-222 with corresponding class loaders 240-242.

Furthermore, the host application 211 in the Java EE runtime 201 can access and control the OSGi runtime 202. For example, the host application 211 can act as a system bundle for the OSGi runtime 202, and can load the OSGi runtime 202 using a class loader 231, whose parent is an application class loader. Thus, the host application 211 can be configured to export its resources to the OSGi runtime 202 and/or consume various OSGi services.

Additionally, using the host application 211, the system allows for the integration of the OSGi platform and the Java EE platform, without requiring any special support from the underlying Java EE runtime 201. Thus, the host application 211 can continue to run as a native Java EE application.

Figure 3:
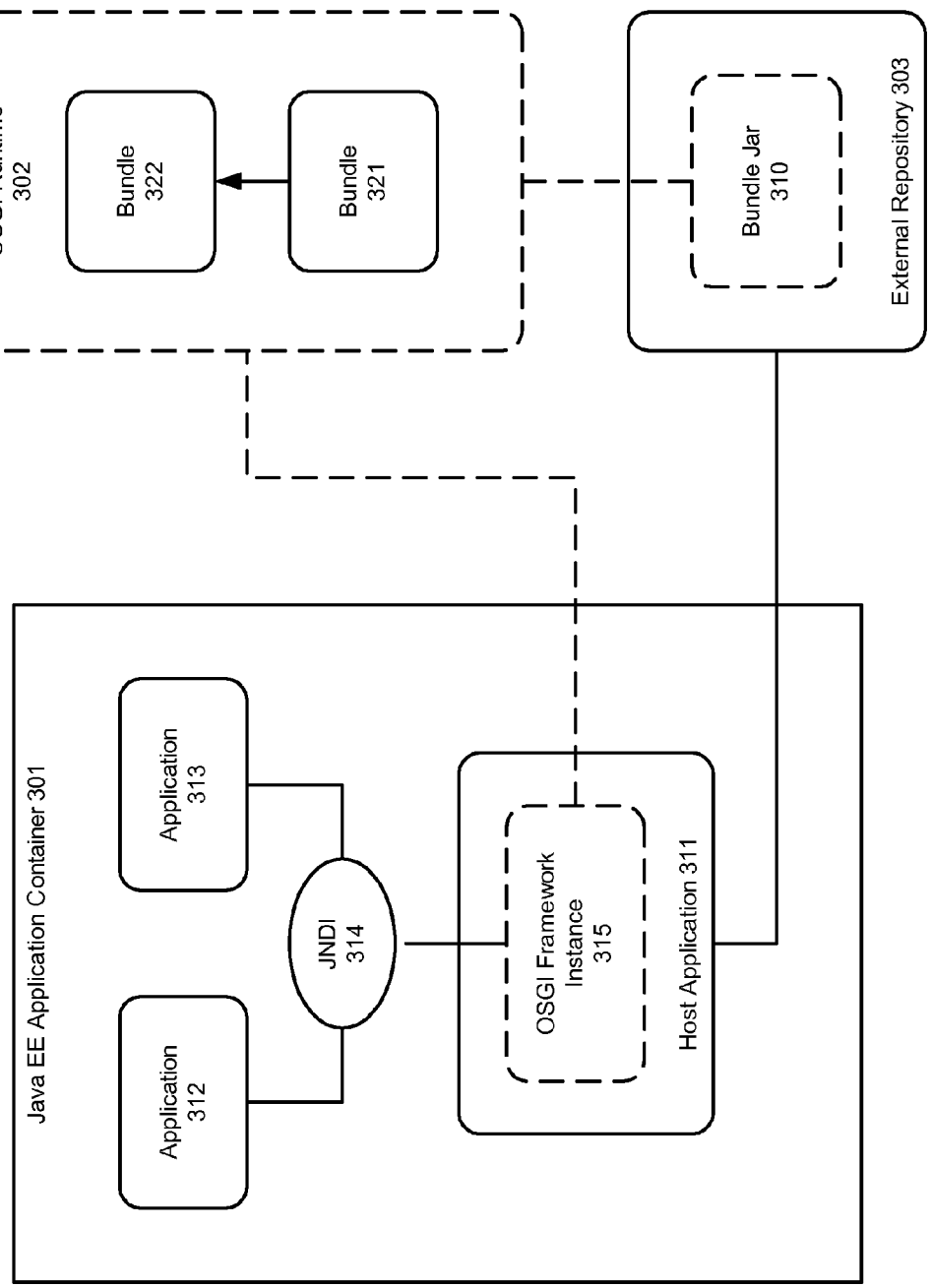
FIG. 3 shows an illustration of provisioning an OSGi framework by a Java EE application in an application development environment, in accordance with an embodiment of the invention.

FIG. 3 shows an illustration of provisioning an OSGi framework by a Java EE application in an application development environment, in accordance with an embodiment of the invention. As shown in FIG. 3, an application development environment 300 allows an OSGi framework instance 315, which is associated with an OSGi runtime 302, to be bootstrapped within a host application 311 in a Java EE application container 301.

In accordance with an embodiment of the invention, the life cycle of the OSGi framework 315 can be tied to the life cycle of the host application 311. For example, the OSGi framework can be activated when the host application 311 is started/loaded by the Java EE application container 301. Also, the OSGi framework 315 can be deactivated when the host application 311 is stopped/unloaded.

The OSGi framework instance 315 can be published in the Java EE application container 301, if the OSGi framework instance 315 needs to be shared by other applications 312-313 in Java EE application container 301. For example, the host application 311 can use JNDI 314 Java EE application container 301 to control the visibility of a published OSGi framework instance 315, in order to take advantage of the simplicity, versatility and namespace support of JNDI 314. Alternatively, the OSGi framework instance 315 can be published using a JMX server in the Java EE application container 301.

In accordance with an embodiment of the invention, a Java EE application developer can provision the OSGi framework 315 based on a programmatic approach. Here, the programmatic approach, which can be dynamic and easily customizable, may not require any change to the underlying application container. Alternatively, a Java EE application developer can provision the OSGi framework 315 based on application configuration mechanism in the Java EE application container 301.

Furthermore, the host application can provision various services in the OSGi runtime. These services can include EJBs, DataSources, CDI beans, POJOs, etc. Also, the system can install and start a set of OSGi bundles 321-322, while provisioning the OSGi framework. Here, the OSGi bundle jars 310 that contain the OSGi bundles 321-322 can be embedded inside the application 311 or can be downloaded from an external repository 303.

Figure 4:
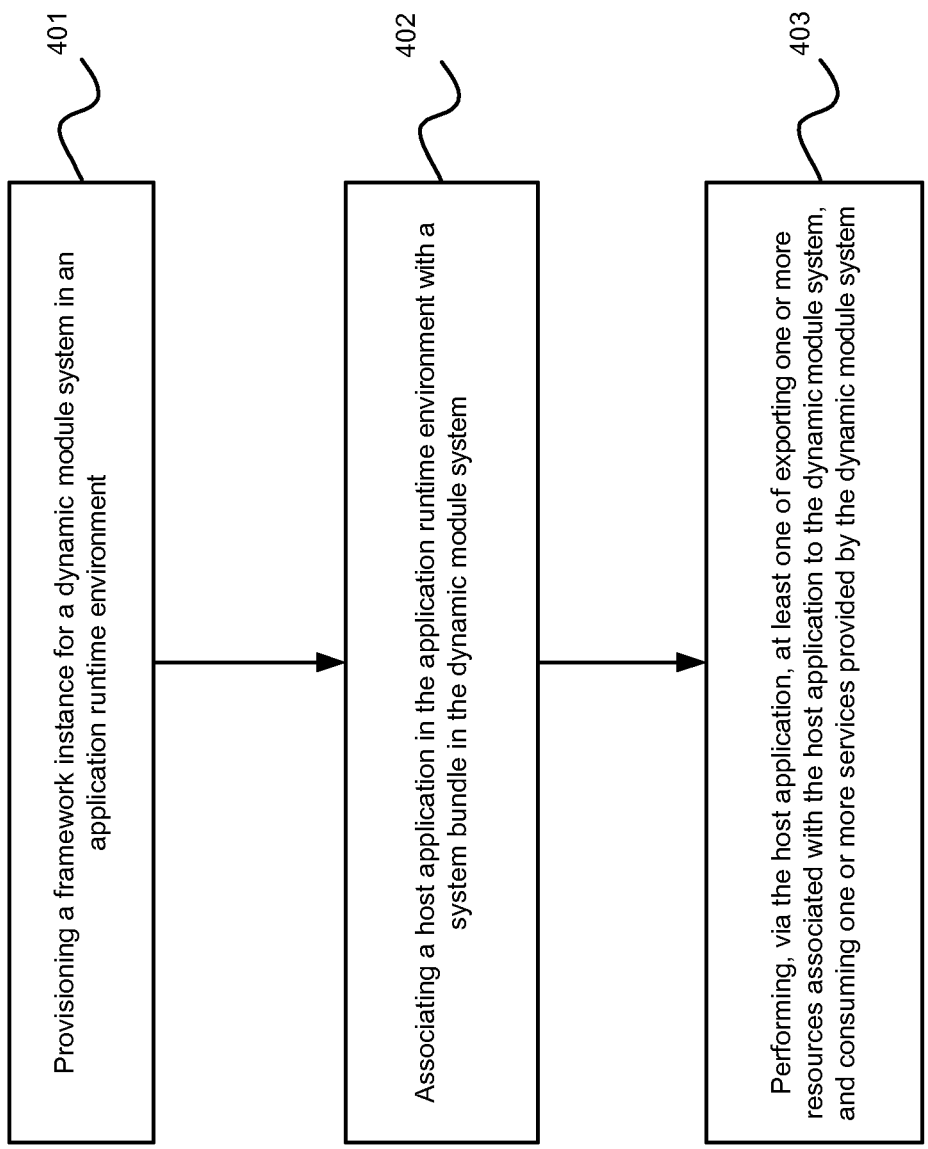
FIG. 4 illustrates an exemplary flow chart for supporting a host application in an application development environment, in accordance with an embodiment of the invention.

FIG. 4 illustrates an exemplary flow chart for supporting a host application in an application development environment, in accordance with an embodiment of the invention. As shown in FIG. 4, at step 401, the system can provision a framework instance for a dynamic module system in an application runtime environment. Furthermore, at step 402, the system can associate a host application in the application runtime environment with a system bundle in the dynamic module system. Then, at step 403, the host application can export one or more resources associated with the host application to the dynamic module system, and/or consume one or more services provided by the dynamic module system.

An Exemplary Host Application

An exemplary host application can be based on OSGi related implementation classes contained in a deployment package.

For example, the OSGi related implementation classes in a "sahoo.samples.wls.ejbosgiservice.server.osgi" package can include a WebappMain class, which is a servlet context listener. Also, this package can include a OSGiFrameworkProvisioner class, which can be a utility class used by the WebappMain class, and a OSGiServicePublisher class, which can be a dummy servlet.

Here, the WebappMain class can be the entry point for the examplary host application. The WebappMain class, together with the OSGiFrameworkProvisioner class, can be responsible for provisioning the OSGi framework in the Java EE application.

For example, the WebappMain class can be responsible for participating in the Java EE application life cycle process that includes receiving the notification of application start/stop events. Also, the WebappMain class can be responsible for creating a class loader that has visibility to application resources and OSGi framework jars. This class loader is used to load the OSGi framework, looking up a framework factory using JDK Service Provider (META-INF/services) mechanism and using it to instantiate a framework instance (e.g. a Felix instance). Additionally, the WebappMain class can be responsible for pre-provisioning a set of bundles into the framework (e.g. Felix shell bundles), and publishing the framework in JNDI as java:global/osgi-framework.

Furthermore, the OSGiServicePublisher class, which can be a dummy servlet, is responsible for publishing services to the OSGi runtime. The OSGiServicePublisher class can be set up to be loaded on startup. Since the OSGiServicePublisher class is a servlet, the OSGiServicePublisher class is guaranteed to be loaded after the OSGiFrameworkProvisioner class, which is a ServletContextListener. Thus, the OSGiFrameworkProvisioner class can safely use the OSGi framework from JNDI.

The following List 1 shows an EJB that can be used by the exemplary host application.

---
List 1
---
```
@Resource(lookup = "java:global/osgi-framework") Bundle bundle;
@EJB private Foo fooEjb;
public void init(ServletConfig servletConfig) throws ServletException {
    BundleContext bctx = bundle.getBundleContext( );
    bctx.registerService(Foo.class.getName( ), fooEjb, null);
    super.init(servletConfig);
}
```
---

As shown in the above, the EJB can be based on a "sahoo.samples.wls.ejbosgiservice.server.impl.FooEjb.class," which has a local business interface, "sahoo.samples.wls.ejbosgiservice.server.api.Foo.class."

Also, the host application can use the framework configuration properties file (e.g. an osgi.properties file) to configure exportation of the package. Here, in order to use the exported EJB as an OSGi service, the host application can export the EJB business interface packages for other bundles, e.g. using the following entry in an osgi.properties configuration file:

org.osgi.framework.system.packages.extra=sahoo.
        samples.wls.ejbosgiservice.server.api;   version=1.0,
        javax.ejb; version=3.0

As shown in the above, the host application is able to export not only packages, but also different classes, from a parent class loader.

Additionally, the system can use shell bundles, such as the Felix remote shell bundles in WEB-INF/bundles/. Thus, after a user deploy the application into a Java EE server, the user can connect to the provisioned OSGi runtime, via the Felix remote shell bundle, and inspect the application.

The following List 2 shows a manifest for a pure OSGi bundle that can access the EJB interface package and the EJB service based on the OSGi mechanism.

---
List 2
---
[MANIFEST sahoo.samples.wls.ejbosgiservice.osgiclient.jar]
Bundle-Activator        sahoo.samples.wls.ejbosgiservice.osgiclient.- Activator 2
Bundle-ManifestVersion
Bundle-SymbolicName    sahoo.samples.wls.ejbosgiservice.osgiclient
Created-By               X.X.0_0X (XXX Corporation)
Import-Package         sahoo.samples.wls.ejbosgiservice.server.api,
                           org.osgi.framework
Manifest-Version       1.0
---

As shown in the above, this bundle can import the EJB interface package. Also, this bundle may not be aware that it is calling an EJB, since it has a bundle activator.

The following List 3 shows an exemplary bundle activator, which can look up the service in OSGi service registry and invokes a business method.

---
List 3
---
```
public class Activator implements BundleActivator {
    public void start(BundleContext ctx) {
        Foo foo = (Foo)ctx.getService(ctx.getServiceReference
            (Foo.class.getName( )));
        System.out.println(foo.bar( ));
    }
```
---
List 3
---
```
    public void stop(BundleContext ctx) {
    }
}
```
---

Client Application

In accordance with an embodiment of the invention, the system can use a client application to consume a service registered by another application.

Figure 5:
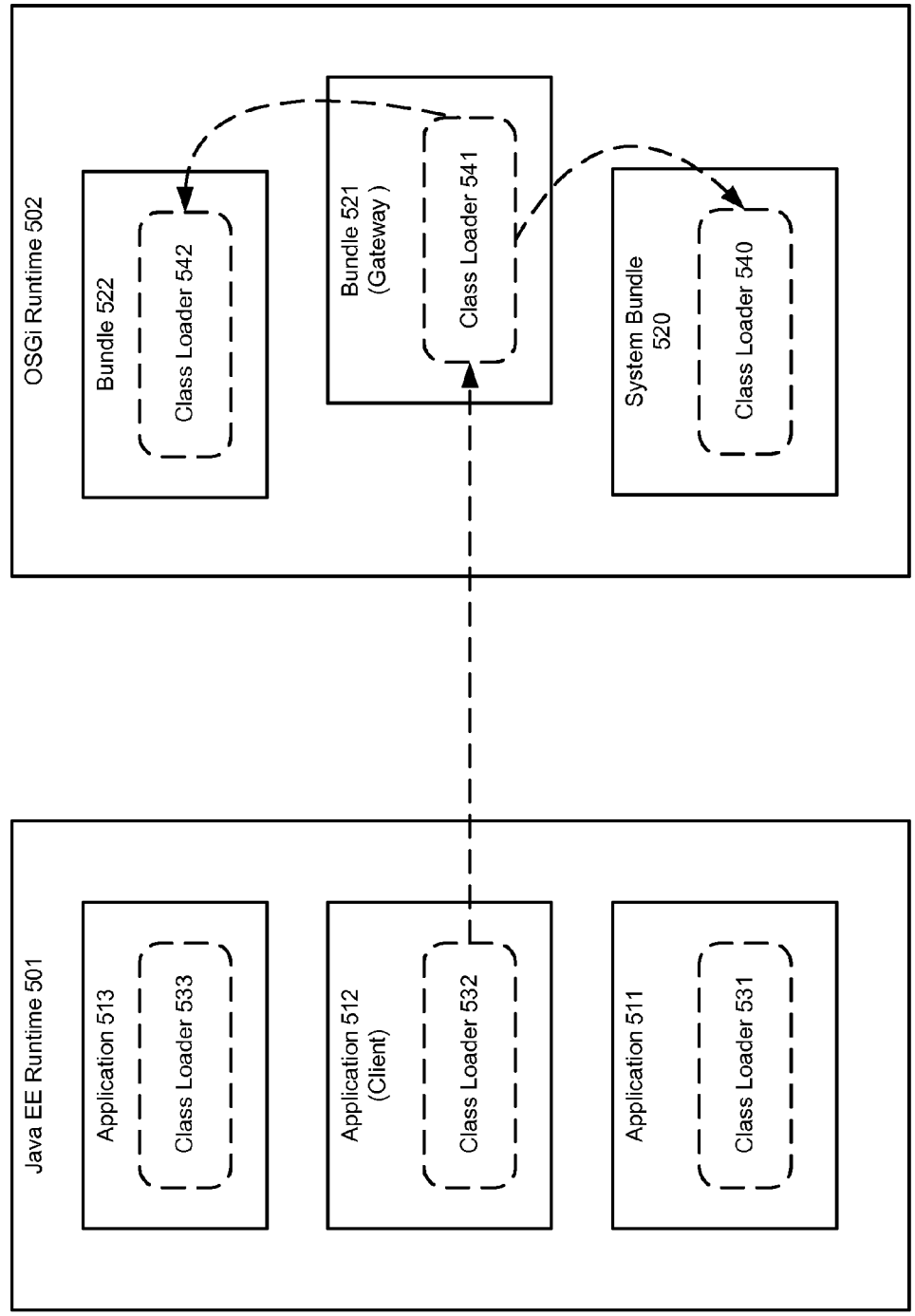
FIG. 5 shows an illustration of supporting a client application in an application development environment, in accordance with an embodiment of the invention.

FIG. 5 shows an illustration of supporting a client application in an application development environment, in accordance with an embodiment of the invention. As shown in FIG. 5, an application development environment 500 enables the integration of an application runtime environment, e.g. a Java EE runtime 501, with a dynamic module system, e.g. an OSGi runtime 502. For example, the Java EE runtime 501 can support different applications 511-513 with corresponding class loaders 531-533, and the OSGi runtime 502 can support different bundles 520-522 with corresponding class loaders 540-542.

In accordance with an embodiment of the invention, a client application 512 in the Java EE environment 501 can obtain a reference to an OSGi runtime 502. As shown in FIG. 5, the client application 512 can select a bundle 521, e.g. from its own directory of bundles, as the gateway bundle to access the OSGi runtime 502. Here, the gateway bundle 521 allows the client application 512 to have better control over which resources or services that it wants to import from the OSGi runtime 502. Furthermore, the gateway bundle 521 also simplifies security configuration and lifecycle management of the client application 512.

Additionally, in order for the client application 512 in the Java EE environment 501 to have visibility to the host application classes in the bundles 520-522, the class loader 532 for the client application 512 can be set up to delegate to a referenced bundle class loader 540-542. The metadata of the referenced bundle 520-522 can determine which classes are made available to the client application 512. For example, the system can configure that whatever is loadable via Bundle.loadClass or Bundle.getResource type API can be made available to the client application 512.

Figure 6:
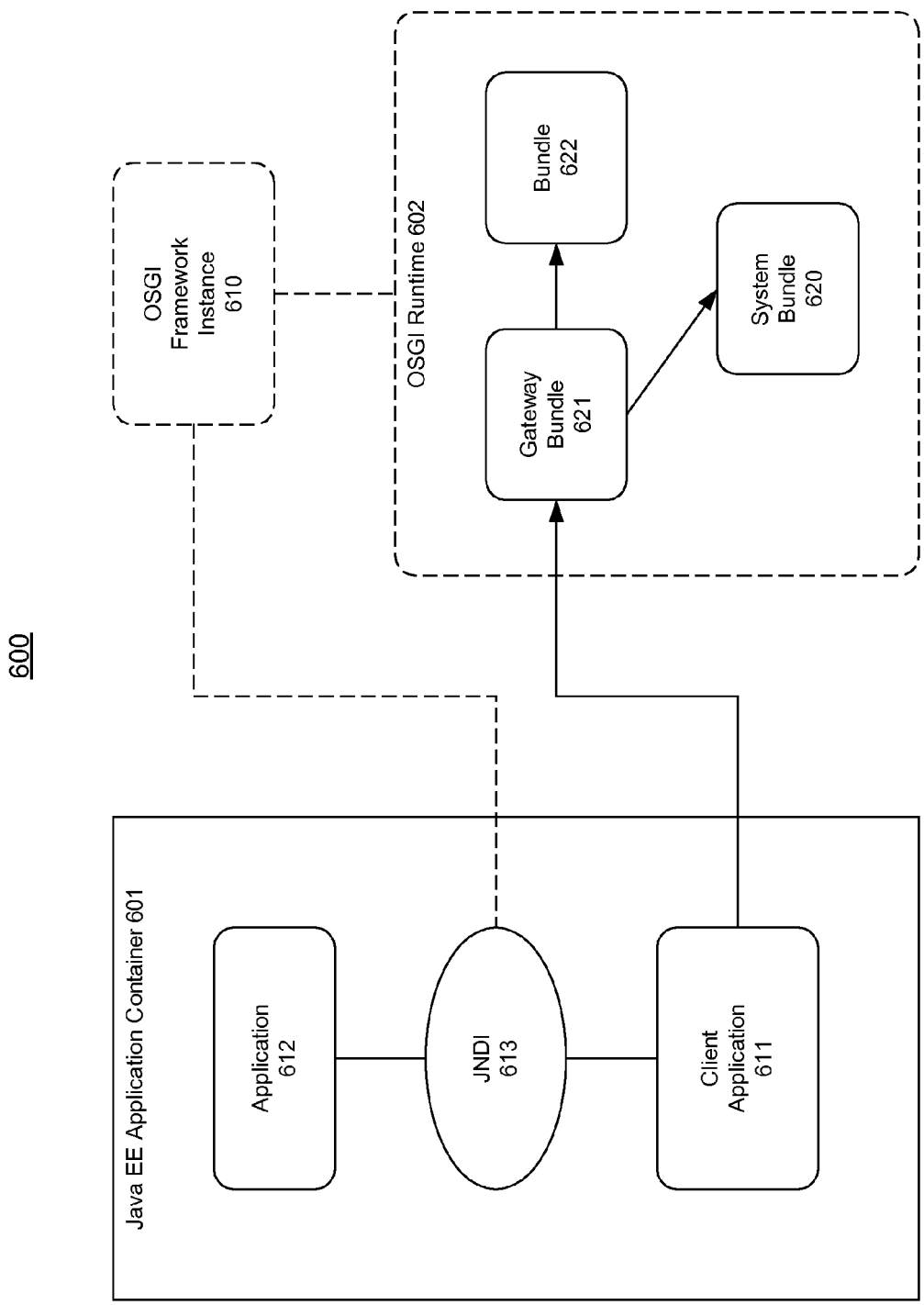
FIG. 6 shows an illustration of referencing an OSGi runtime by a client application in an application execution environment, in accordance with an embodiment of the invention.

FIG. 6 shows an illustration of referencing an OSGi runtime by a client application in an application execution environment, in accordance with an embodiment of the invention. As shown in FIG. 6, a client application 611 in a Java EE application container 601 can reference an OSGi runtime 602, in order to export and/or import resources to and/or from the OSGi runtime 602.

For example, the client application 611 can obtain a reference to an OSGi framework instance 610 from JNDI 613. Here, the OSGi framework instance 610 can implement an "org.osgi.framework.Bundle" interface, which provides access to the OSGi runtime 602. Additionally, when the client application 611 is also a host application (e.g. in the case of the host application 311 as shown in FIG. 3), the object to access the OSGi runtime 602 can be the OSGi framework instance 315, which is provisioned by the host application 311.

As shown in FIG. 6, the system can make the bundle 621 available in a fixed JNDI 613 location, which allows another application 612, or any code in the same module, to access the bundle 621. Also, the client application 611 can use the bundle 621 as a gateway to access the OSGi runtime 602 for publishing and/or consuming OSGi services.

Furthermore, the client application 611 can state a dependency on the OSGi runtime 602 and configure a gateway bundle 621 that can be used to access the OSGi runtime 602. For example, the system can be based on the "OSGi for Applications" feature in the WebLogic environment.

Additionally, in order to access the OSGi runtime 602, the application developers can use annotation or deployment descriptor to specify the name of the framework instance 610 to use, a directory within the client application 611, which can be used to scan bundle jar files that are automatically installed and started as part of the client application 611, and a bundle 621 that is used as the gateway to the referenced OSGi runtime.

The following List 4 shows an exemplary descriptor entry.

List 4

```
<osgi-framework-reference>
    <name>java:global/osgi-framework</name>
    <bundles-directory>WEB-INF/osgi-lib</bundles-directory>
    <application-bundle-symbolic-name>bundle1</application-bundle-
    symbolic-name>
</osgi-framework-reference>
```

The following List 5 shows an exemplary annotation.

List 5

```
@OSGiFrameworReference(
    name = "java:global/osgi-framework",
    bundlesDir="WEB-INF/osgi-lib",
    bundle = "someBundleSymbolicName[:Version]")
```

Thus, when the application 611 is started, the Java EE runtime 601 can parse the above descriptor entries in List 4 or analyze the above annotation in List 5 to set up the environment, For example, the Java EE application container 601 can install and start a set of bundles 620-622 in the referenced framework 610, set up the application class loader to also delegate to the class loaders associated with the different referenced bundles 620-622, and make the referenced bundle 620-622 available, e.g. in a module specific JNDI name such as "java:module/osgi-bundle."

Furthermore, the Java EE container 601 can stop and/or uninstall the bundles 620-622, when the client application 611 is stopped.

In accordance with an embodiment of the invention, the system can handle inter-application dependency among various client applications and host applications involved in the class loader organization. The class loader organization can determine how client applications depend on host applications via the OSGi module layer. Additionally, the client application and host applications can use each others' published services.

Figure 7:
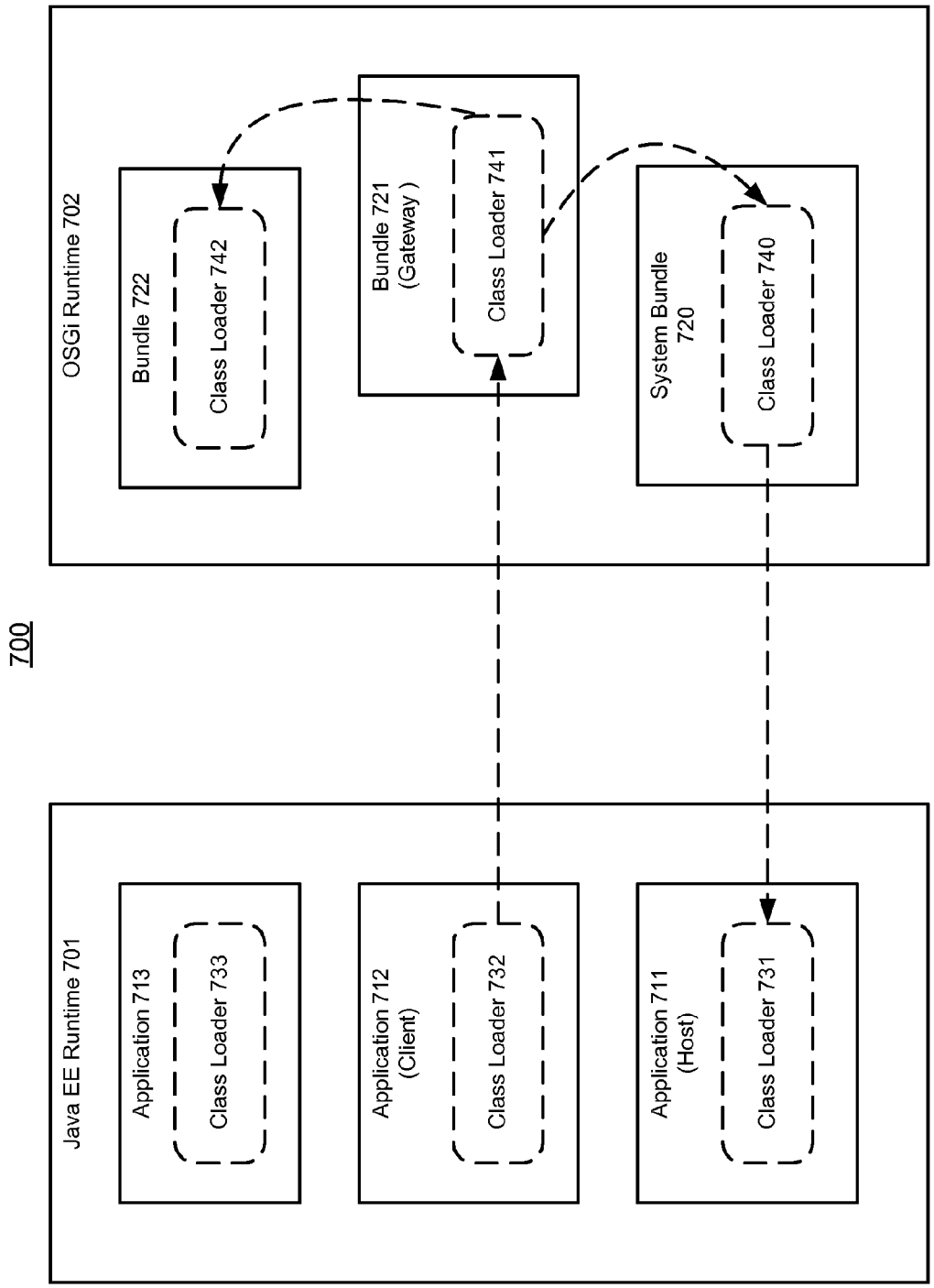
FIG. 7 shows an illustration of handling inter-application dependency in an application development environment, in accordance with an embodiment of the invention.

FIG. 7 shows an illustration of handling inter-application dependency in an application development environment, in accordance with an embodiment of the invention. As shown in FIG. 7, an application development environment 700 enables the integration of an application runtime environment, e.g. a Java EE runtime 701, and a dynamic module system, e.g. an OSGi runtime 702.

For example, the Java EE runtime 701 can support different applications 711-713 with corresponding class loaders 731-733, and the OSGi runtime 702 can support different bundles 720-722 with corresponding class loaders 740-742.

As shown in FIG. 7, a host application 711 in the Java EE runtime environment 701 can provision the OSGi runtime 702, and a client application 712 in the Java EE environment 701 can obtain a reference to the OSGi runtime 702.

Furthermore, the system involves a life cycle dependency between the host application 711 and client applications 712. This dependency can be handled in the Java EE runtime 701 frameworks. For example, different Java EE servers, such as WebLogic Server and GlassFish, can support deployment order for various Java EE applications. Inside a deployment file, such as an EAR file, the deployment order for different modules can be controlled using Java EE configuration file, e.g. the application.xml file.

Thus, the host applications, such as the application 711, can be configured to be loaded ahead of the client applications, such as the application 712, and the opposite order can apply during the unloading of the client applications. Furthermore, there can be no additional life cycle requirements, if the client application 712 does not install any framework extension bundles.

Additionally, an OSGi framework can be used only in the local server since the OSGi runtime 702 is not a serializable entity. When an application is deployed to a cluster, then the application can automatically get loaded in each cluster instance separately. Thus, as part of loading in different cluster instance, an OSGi framework can be provisioned separately on each cluster instance. This ensures that the OSGi framework may always be available locally, and can make the OSGi/Java EE integration working in a cluster.

Furthermore, some JNDI implementations, such as WebLogic JNDI, can support replication in a cluster. In order to publish the OSGi framework to global JNDI context in such an environment, the system can make sure that the underlying JNDI implementation does not try to replicate OSGi framework in a cluster. For example, in WebLogic JNDI, the system can set the "weblogic.jndi.replicateBindings" property to "false," while exporting the OSGi framework object to the global JNDI context.

Moreover, security can be built into every layer of the OSGi framework, and can be used when JVM is started with a security manager. The security manager can define a number of permission classes that control access to OSGi API. Since the OSGi API can be directly accessed by Java EE application code, an administrator can control the security at the level of Java EE application code. For example, the client application may require being given appropriate OSGi permission to call Bundle.getBundleContext.

Figure 8:
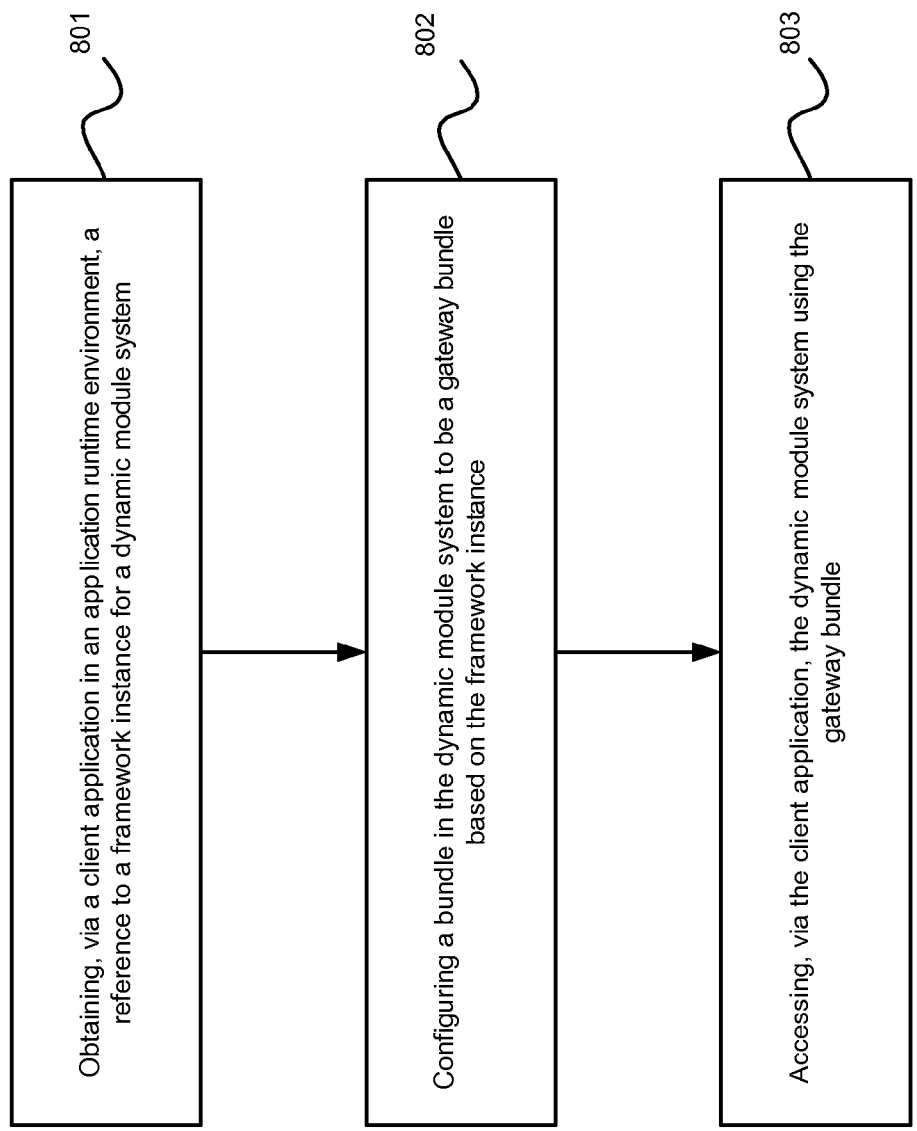
FIG. 8 illustrates an exemplary flow chart for supporting a client application in an application development environment, in accordance with an embodiment of the invention.

FIG. 8 illustrates an exemplary flow chart for supporting a client application in an application development environment, in accordance with an embodiment of the invention. As shown in FIG. 8, at step 801, a client application in an application runtime environment can obtain a reference to a framework instance for a dynamic module system. Furthermore, at step 802, the client application can configure a bundle in the dynamic module system to be a gateway bundle based on the framework instance. Then, at step 803, the client application can access the dynamic module system using the gateway bundle.

An Exemplary Client Application

The following List 6 shows a servlet that can be used by an exemplary client application.

List 6

```
@WebServlet(urlPatterns="/")
public class FooServlet extends HttpServlet {
    private static final String ejbJndiName =
    "java:global/sahoo.samples.wls.ejbosgiservice.server/FooEjb";
```

List 6

```
@EJB(lookup = ejbJndiName) Foo foo;
public void service(javax.servlet.ServletRequest servletRequest,
javax.servlet.ServletResponse servletResponse) throws javax.servlet.
ServletException {
    try {
        servletResponse.getWriter( ).println(this.foo.bar( ));
        servletResponse.getWriter( ).flush( );
    } catch(Exception e) {
        e.printStackTrace( );
    }
  }
}
```

As shown in the above, the servlet, FooServlet, can inject a local EJB, which can be part of another independently deployed application, using a portable JNDI name, e.g. "java:global/sahoo.samples.wls.ejbosgiservice.server/FooEjb." Furthermore, the servlet, FooServlet, can invoke the business method of the EJB, FooEjb, and can print the result to response stream in the service method. Here, there is no need to bundle the EJB interface classes. Even when the EJB interface classes are bundled, the local EJBs are called via "call by reference" semantics, which means that both the callee and the caller shares the same runtime classes for the interfaces.

Additionally, a user can access the servlet by visiting the following URL.

http://localhost:7001/sahoo.samples.wls.ejbosgiservice.webclient

The user can expect the following response.

sahoo.samples.wls.ejbosgiservice.server.impl.FooEjb_leq6pa_Impl@fa083da

The following List 7 shows a configuration file in the deployment file, e.g. a weblogic.xml file in the WEB-INF directory.

List 7

```
<weblogic-web-app xmlns="http://xmlns.oracle.com/weblogic/
weblogic-web-app"
   <container-descriptor>
      <prefer-web-inf-classes>false</prefer-web-inf-classes>
   </container-descriptor>
   <osgi-framework-reference>
      <name>java:global/osgi-framework</name>
      <application-bundle-symbolic-name>
          sahoo.samples.wls.ejbosgiservice.webclient.bundle
      </applicationbundle-symbolic-name>
   </osgi-framework-reference>
</weblogic-web-app>
```

Furthermore, the exemplary client application can configure a bundle, such as sahoo.samples.wls.ejbosgiservice.webclient.bundle, as the OSGi gateway bundle. This bundle can be packaged as:

WEB-INF/osgi-lib/sahoo.samples.wls.ejbosgiservice.webclient.bundle.jar

This bundle jar can be an empty jar, which imports the EJB interface package. The following List 8 shows a manifest for the bundle jar.

[MANIFEST sahoo.samples.wls.ejbosgiservice.webclient.bundle.jar]
Bundle-ManifestVersion 2
Bundle-SymbolicName sahoo.samples.wls.ejbosgiservice.webclient.bundle
Created-By 1.7.0_09 (Oracle Corporation)
Import-Package sahoo.samples.wls.ejbosgiservice.server.api
Manifest-Version 1.0

Furthermore, this gateway bundle can be installed into the same framework that was provisioned by the exemplary host application as described in the previous section. Also, the class loader for the exemplary host application can be set up to delegate to this gateway bundle. The delegate bundle can be wired to the EJB interface package that is part of the host application.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modification and variation include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method, in an application development system comprising a memory and one or more microprocessors, for supporting a hybrid application development environment, including support for reference in an application runtime environment relative to an associated dynamic module system, the method comprising:

obtaining, via a first client application in the application runtime environment, a reference to a framework instance for the associated dynamic module system;

configuring a bundle in the dynamic module system to be a gateway bundle based on the reference to the framework instance;

making the gateway bundle available in a predetermined location of a shared namespace in the memory for selective access by a second client application in the application runtime environment; and accessing, via the first client application or selectively by the second client application, the dynamic module system using the gateway bundle.

2. The method according to claim 1, further comprising:
allowing the framework instance to be at least one of:
published in the application runtime environment, or
provisioned by a host application.

3. The method according to claim 1, further comprising:
using annotation or deployment descriptor to specify at least one of:
a name of the framework instance,
a directory, associated with the first client application, which can be used to scan bundle jar files that are automatically installed and started as part of the first client application, and
a bundle that is used as the gateway bundle to the dynamic module system.

4. The method according to claim 3, further comprising:
parsing, via the application runtime environment, the annotation or the deployment descriptor, when the first client application is started.

5. The method according to claim 4, further comprising:
installing and starting a set of bundles in the reference framework instance,
setting up an application class loader to delegate to a class loader associated with a referenced bundle in the set of bundles, and
making available a referenced bundle in the application runtime environment.

6. The method according to claim 5, further comprising:
stopping and uninstalling the set of bundles when the first client application is stopped.

7. The method according to claim 1, further comprising:
coupling a life cycle of the framework instance with a life cycle of the first client application.

8. The method according to claim 1, further comprising:
provisioning a framework instance separately on each instance in a cluster, when the first client application is deployed to the cluster.

9. The method according to claim 1, further comprising:
allowing the first client application to continually run as a native application in the application runtime environment.

10. The method according to claim 1, further comprising:
allowing the dynamic module system to be an OSGI system and the application runtime environment to be a Java EE runtime environment, and
wherein the making the gateway bundle available comprises making the gateway bundle available at a fixed Java naming and directory interface (JNDI) location, which allows another client application, or any code in one or more modules of the first client application to access the gateway bundle.

11. A system for supporting a hybrid application development environment, including support for reference in an application runtime environment relative to an associated dynamic module system, the system comprising:
one or more microprocessors operatively coupled with a memory,
a first client application in the application runtime environment running on the one or more microprocessors, wherein the first client application operates to perform steps comprising:
obtaining a reference to a framework instance for a dynamic module system;
configuring a bundle in the dynamic module system to be a gateway bundle based on the reference to the framework instance;
making the gateway bundle available in a predetermined location of a shared namespace in the memory for selective access by a second client application in the application runtime environment; and
accessing the dynamic module system by the first client application or selectively by the second client application using the gateway bundle.

12. The system according to claim 11, wherein:
the framework instance is at least one or more of: published in the application runtime environment, or provisioned by a host application.

13. The system according to claim 11, wherein:
annotation or deployment descriptor is used to specify at least one of:
a name of the framework instance,
a directory, associated with the first client application, which can be used to scan bundle jar files that are automatically installed and started as part of the client first application, and
a bundle that is used as the gateway bundle to the dynamic module system.

14. The system according to claim 13, wherein:
the application runtime environment is configured to parse the annotation or the deployment descriptor, when the first client application is started.

15. The system according to claim 14, wherein:
the application runtime environment operates to:
install and start a set of bundles in the reference framework instance,
set up an application class loader to delegate to a class loader associated with a referenced bundle in the set of bundles, and
make a referenced bundle available in the application runtime environment.

16. The system according to claim 15, wherein:
the application runtime environment operates to stop and uninstall the set of bundles when the first client application is stopped.

17. The system according to claim 11, wherein:
the application runtime environment operates to couple a life cycle of the framework instance with a life cycle of the first client application.

18. The system according to claim 11, wherein:
a framework instance is provisioned separately on each instance in a cluster, when the first client application is deployed to the cluster.

19. The system according to claim 11, wherein:
the first client application operates to continually run as a native application in the application runtime environment.

20. A non-transitory machine readable storage medium having instructions stored thereon that when executed cause a system to perform steps comprising:
obtaining, via a first client application in an application runtime environment, a reference to a framework instance for a dynamic module system;
configuring a bundle in the dynamic module system to be a gateway bundle based on the reference to the framework instance;
making the bundle available in a predetermined location of a shared namespace in the memory for selective access by a second client application in the application runtime environment; and accessing, via the first client application or selectively by the second client application, the dynamic module system using the gateway bundle.

* * * * *